United States Patent
Jeon et al.

(10) Patent No.: US 8,599,796 B2
(45) Date of Patent: Dec. 3, 2013

(54) METHOD AND APPARATUS FOR HANDOVER BETWEEN COMMUNICATION NETWORK AND BROADCAST NETWORK

(75) Inventors: Hong Seok Jeon, Daejeon (KR); Eunah Kim, Daejeon (KR); Junghoon Jee, Seoul (KR); Chang Min Park, Daejeon (KR); Hyunho Park, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 407 days.

(21) Appl. No.: 12/986,690

(22) Filed: Jan. 7, 2011

(65) Prior Publication Data

US 2011/0206002 A1 Aug. 25, 2011

(30) Foreign Application Priority Data

Jan. 8, 2010 (KR) .................. 10-2010-0001907
Dec. 28, 2010 (KR) .................. 10-2010-0136936

(51) Int. Cl.
*H04W 4/00* (2009.01)

(52) U.S. Cl.
USPC ........................................ 370/331

(58) Field of Classification Search
USPC ................................. 370/310–464
See application file for complete search history.

(56) References Cited

U.S. PATENT DOCUMENTS

| | | | |
|---|---|---|---|
| 7,596,385 B2 | 9/2009 | Aghvami et al. | |
| 2006/0274697 A1* | 12/2006 | Kim et al. | 370/331 |
| 2008/0304454 A1* | 12/2008 | Zhong et al. | 370/331 |
| 2008/0304458 A1* | 12/2008 | Aghvami et al. | 370/338 |
| 2009/0310566 A1* | 12/2009 | Xu et al. | 370/331 |
| 2010/0118771 A1* | 5/2010 | Lee et al. | 370/328 |
| 2010/0284291 A1* | 11/2010 | Perras et al. | 370/252 |
| 2011/0064050 A1* | 3/2011 | Livet et al. | 370/331 |

FOREIGN PATENT DOCUMENTS

| | | |
|---|---|---|
| GB | EP 2 061 166 A2 * | 11/2008 |
| KR | 10-2007-0108324 A | 11/2007 |
| KR | 10-2008-0068578 A | 7/2008 |

OTHER PUBLICATIONS

N. Vulic, et al., "DVB-H—UMTS Integration at Radio Access Level", Vehicular Technology Conference, Apr. 22-25, 2007, p. 1250-1254.

* cited by examiner

*Primary Examiner* — Kwang B Yao
*Assistant Examiner* — Juvena Loo
(74) *Attorney, Agent, or Firm* — Kile Park Reed & Houtteman PLLC (57) ABSTRACT

An exemplary embodiment of the present invention provides a method of commanding, by a handover control apparatus, a group of terminals to perform handover from a broadcasting network to a communication network, the method comprising generating a handover indication message including service information for identifying the group of terminals and transmitting the handover indication message to the group of terminals.

15 Claims, 3 Drawing Sheets

METHOD AND APPARATUS FOR HANDOVER BETWEEN COMMUNICATION NETWORK AND BROADCAST NETWORK

CROSS-REFERENCE TO RELATED APPLICATION

This application claims priority to and the benefit of Korean Patent Application Nos. 10-2010-0001907 and 10-2010-0136936 filed in the Korean Intellectual Property Office on Jan. 8, 2010 and Dec. 28, 2010, the entire contents of which are incorporated herein by reference.

BACKGROUND OF THE INVENTION (a) Field of the Invention

The present invention relates to a provision of broadcast contents, and more particularly, to a handover method between a broadcasting network and a communication network for providing broadcast contents.

(b) Description of the Related Art

With the development of an IT technology, a terminal including both a communication network receiver and a broadcasting network receiver has been propagated. The broadcast contents may be provided through the communication network or the broadcasting network.

A user terminal may receive the broadcast contents (for example, baseball game) through the broadcasting network. When the corresponding broadcast contents forcibly end according to regular broadcasting scheduling, the user may want to continuously view the corresponding broadcast contents. In this case, a handover procedure between the broadcasting network and the communication network is required.

A general handover procedure between the broadcasting network and the communication network starts by a request of a terminal. That is, the terminal continuously measures wireless signals therearound and reports the measured results to a network that is presently accessed by the terminal. The network to which the measured results are reported from the terminal determines a handover operation according to a predetermined reference and the terminal request resource reservation to a network (that is, a target network) to which the handover is made. Therefore, the terminal may continuously receive the corresponding broadcast contents through the handover operation and the resumption of a broadcasting service between the communication network and the broadcasting network.

However, the general handover operation between the communication network and the broadcasting network is limited to a specific terminal requesting the corresponding handover. Therefore, when a group handover targeting a plurality of terminals due to a change in a state of the network is required, it is difficult to perform an appropriate handover operation.

SUMMARY OF THE INVENTION

The present invention has been made in an effort to provide a handover method between a broadcasting network and a communication network.

An exemplary embodiment of the present invention provides a method of commanding, by a handover control apparatus, a group of terminals to perform handover from a broadcasting network to a communication network, the method comprising generating a handover indication message including service information for identifying the group of terminals and transmitting the handover indication message to the group of terminals.

The transmitting of the handover indication message to the group of terminals may include generating a handover request primitive including service information for identifying the group of terminals at a first layer, transmitting the handover request primitive to a second layer, and transmitting the handover indication message to the group of terminals at the second layer.

Another exemplary embodiment of the present invention provides a handover method of a terminal from a broadcasting network to a communication network, the method comprising receiving a handover indication message including service information for identifying a group of terminals belonging to the terminal from a handover control apparatus and executing a handover command based on the handover indication message.

The executing of the handover command based on the handover indication message may include generating a handover indication primitive including the service information at a first layer, transmitting the handover indication primitive to a second layer, and executing a handover command at the second layer.

Yet another exemplary embodiment of the present invention provides a handover control apparatus commanding a group of terminals to perform handover from a broadcasting network to a communication network, the apparatus comprising a first layer generating a handover request primitive including service information for identifying the group of terminals and a second layer receiving the handover request primitive from the first layer and transmitting a handover indication message including the service information to the group of terminals.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

In the specification, a terminal may designate a mobile station (MS), a mobile terminal (MT), a subscriber station (SS), a portable subscriber station (PSS), a user equipment (UE), an access terminal (AT), etc., and may include functions of all or a part of a terminal, mobile station, a mobile terminal, a subscriber station, a portable subscriber station, a user equipment, an access terminal, etc.

Figure 1:
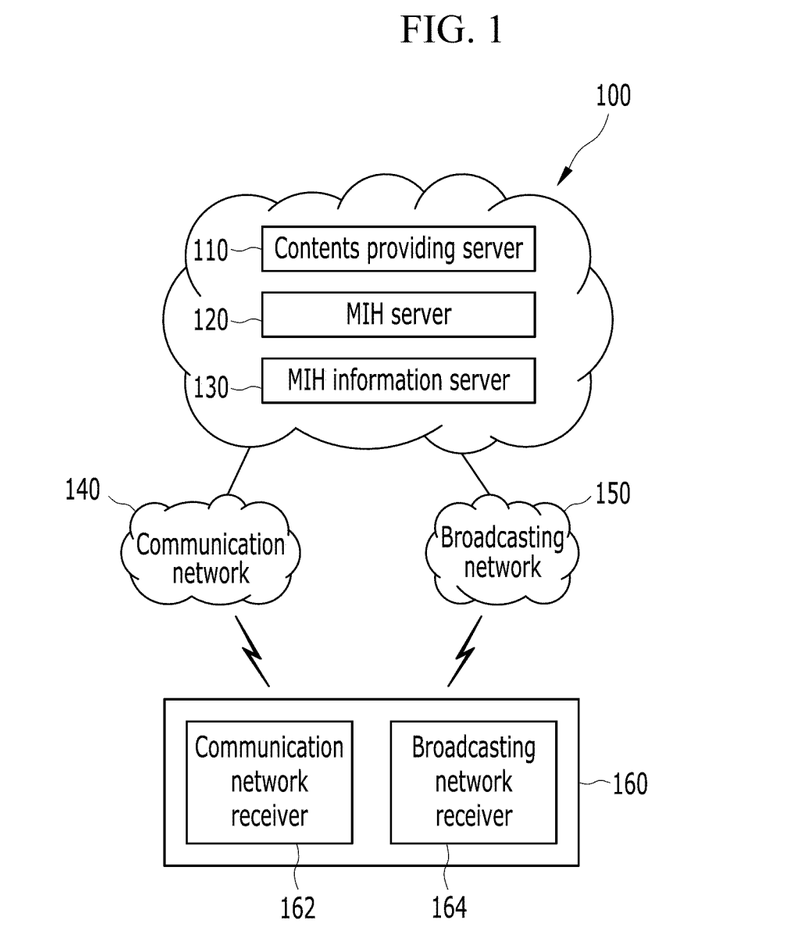
FIG. 1 is a diagram showing a broadcast contents providing system according to an exemplary embodiment of the present invention.

FIG. 1 is a diagram showing a broadcast contents providing system according to an exemplary embodiment of the present invention.

Referring to FIG. 1, a broadcast contents providing system 100 includes a contents providing server 110, a media independent handover (MIH) server 120, an MIH information server 130, a communication network 140, a broadcasting network 150, and a terminal 160.

The contents providing server 110 provides broadcast contents to terminals through the communication network or the broadcasting network. The broadcast contents include general data files and multimedia contents for real-time TV broadcasting service, video on demand service, and so on.

The communication network 140 means a mobile communication network and a wireless communication network that provides bidirectional data communication services and broadcasting services to the terminal 160. For example, the communication network 140 may include a mobile communication network such as $3^{rd}$ Generation Partnership Project (3GPP), 3GPP2, or the like and a wireless network such as WiMAX, Wireless Local Access Network (WLAN), or the like.

The broadcasting network 150 means a wired broadcasting network, a satellite broadcasting network, and a portable mobile broadcasting network that provide a downlink-only broadcasting service. For example, the broadcasting network 150 may include Digital Video Broadcasting-Handheld (DVB-H), MediaFLO, Advanced Television Systems Committee-Mobile/Handheld (ATSC-M/H), or the like.

The MIH server 120 is a network entity that supports the MIH function defined in Institute of Electrical and Electronics Engineers (IEEE) 802.21, 802.21a, 802.21b, 802.21c and/or other 802.21x standard in order to optimize the handover between heterogeneous networks (for example, between the broadcasting network and the communication network). The MIH server 120 may be present in a type that manages both the communication network 140 and the broadcasting network 150 like a centralized management type or may be present at each of the communication network 140 and the broadcasting network 150. In the specification, the MIH server 120 may be compatible with a handover control apparatus.

The MIH information server 130 is a server that manages and provides information on networks around the sever 130 in order to facilitate the network selection and handover operation of the terminal.

The terminal 160 has an MIH client function and has both of a communication network receiver 162 and a broadcasting network receiver 164. The terminal 160 may support the MIH function defined in Institute of Electrical and Electronics Engineers (IEEE) 802.21, 802.21a, 802.21b, 802.21c and/or other 802.21x standard in order to optimize the handover between heterogeneous networks.

When it should be forcibly interrupted to deliver a specific broadcast contents (for example, sports programs) that the terminals receives through the broadcasting network, the MIH server 120 may recognize a plurality of terminals that are watching the forcibly terminated broadcast contents as a group, provide information about available communication networks to the group of terminals, and transmit a message to the group of terminals for commanding to continuously watch the corresponding broadcast contents by performing handover to the corresponding communication network. Hereinafter, handover from a broadcasting network (i.e, a a downlink-only network) to a communication network (i.e, a bidirectional network) will be described.

Figure 2:
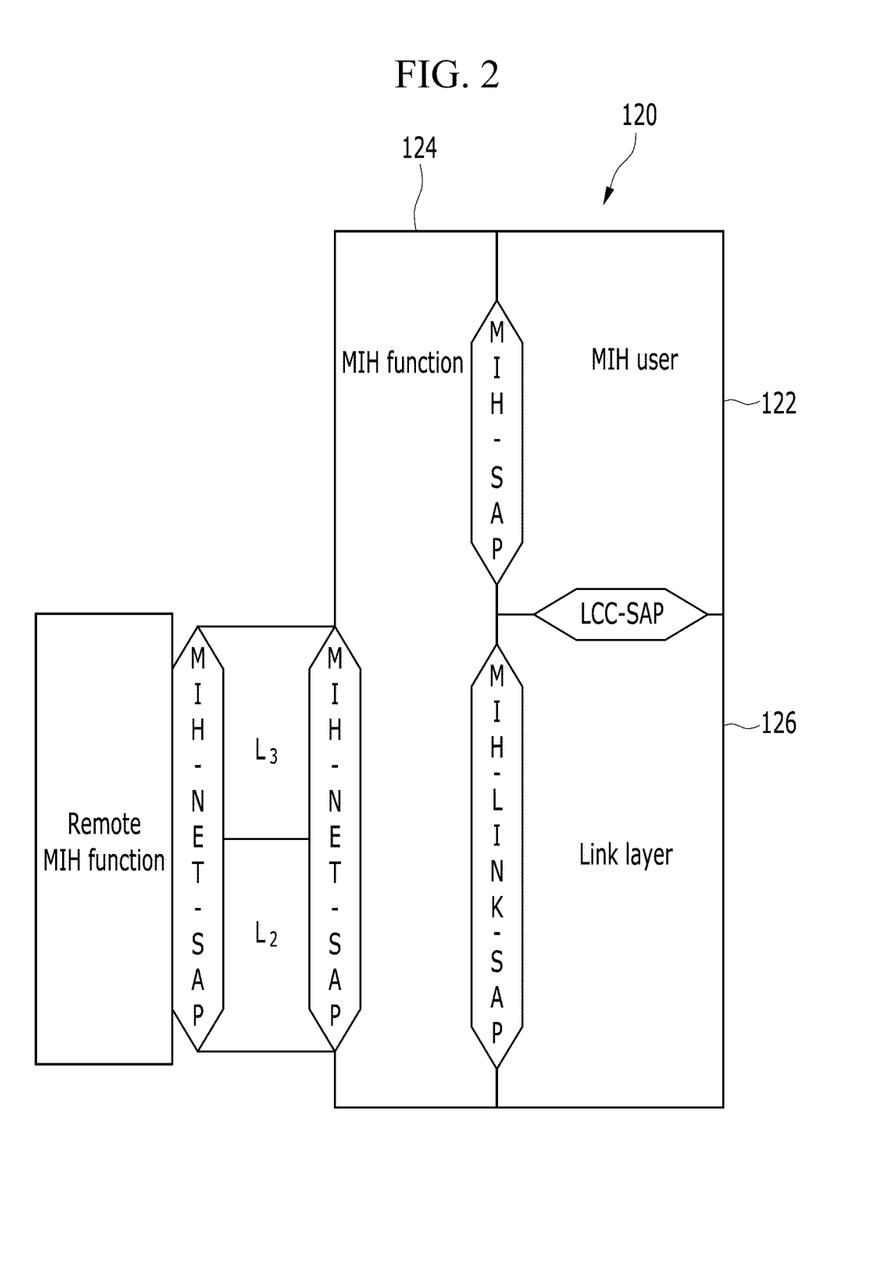
FIG. 2 is a block diagram showing a structure of an MIH server 120 according to an exemplary embodiment of the present invention.
Figure 3:
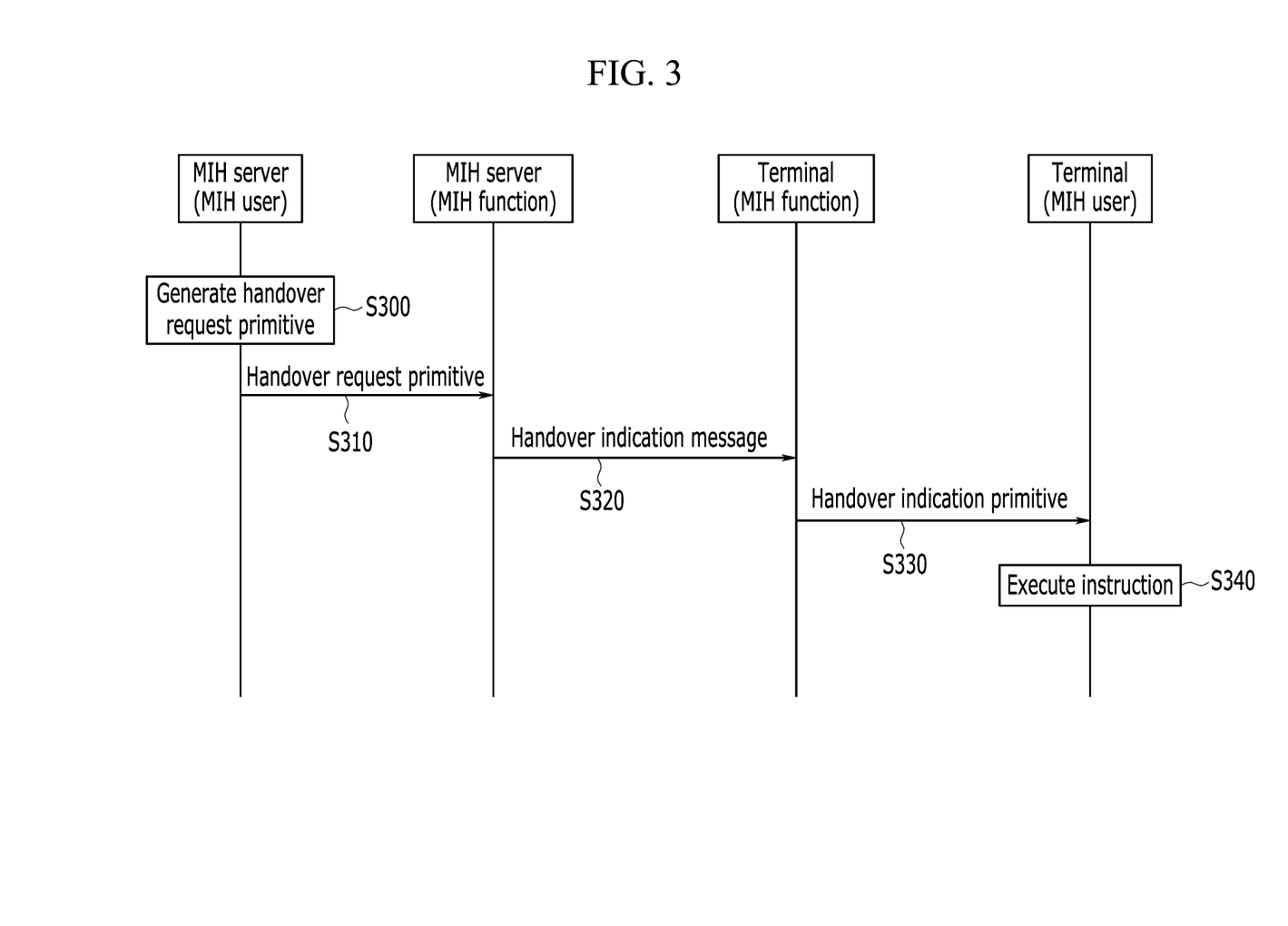
FIG. 3 is a flow chart showing a detailed procedure for performing handover between a broadcasting network and a communication network of the MIH server 120 and a terminal 160 according to an exemplary embodiment of the present invention.

FIG. 2 is a block diagram showing a structure of the MIH server 120 according to an exemplary embodiment of the present invention and FIG. 3 is a flow chart showing a detailed procedure for performing handover between the broadcasting network and the communication network of the MIH server 120 and the terminal 160 according to an exemplary embodiment of the present invention.

Referring to FIG. 2, the MIH server 120 includes an MIH user 122, an MIH function (MIHF) 124, and a link layer 126. Similar to the MIH server 120, the terminal 160 may also include the MIH user, the MIH function, and the link layer.

The MIH technology defines the MIH function (MIHF) 124 as the handover function entity that supports the mutual information exchange between a layer 3 mobility management protocol (and/or an application object) and a layer 2 device driver (and/or a management object). In the MIH, the layer 3 mobility management protocol (and/or the application object) is defined as the MIH user 122 and a Service Access Point (SAP) between the MIH user 122 and the MIHF 124 is defined as MIH_SAP. In addition, the SAP between the link layer 126 and the MIHF 124 is defined as MIH_LINK_SAP.

The SAP, which is an interface for exchanging the information between the adjacent layers present in the same system, is defined as a series of primitives. These primitives indicate services provided between the corresponding adjacent layers and each primitive has available parameters. When a primitive provides a confirmed service, the primitive has four types such as request, indication, response, and confirm. On the other hand, when a primitive provides a non-confirmed service, the primitive has two types such as request and indication In the Institute of Electrical and Electronics Engineers (IEEE) 802.21, 802.21a, 802.21b, 802.21c and/or other 802.21x standard, the service provided between the MIH user and the MIHF is defined as a series of MIH_SAP primitives and the service provided between the MIHF and the link layer is defined as a series of MIH_LINK_SAP primitives.

In FIG. 2, the SAP for communication between remote MIHFs is defined as the MIH_NET_SAP and the communication between the remote MIHFs may use the UDP or TCP communication above layer 3 and may use only the transmission scheme of layer 2. In the case of using the transmission scheme of layer 2, the MIH_LINK_SAP primitive is reused.

In the MIH, a core function service provided through the MIHF is classified into an MIH event, an MIH command, and an MIH information service.

The MIH event service transfers network status information generated from lower device drivers to the upper mobility management protocol so that IP layer (or upper layers) support optimized mobility management. The MIH command service provides an interface for the upper application (and/or the mobility management protocol) to control lower device drivers so that the upper application (and/or the mobility management protocol) change the network connection status or query network status information. The MIH information service defines an MIH information server that is a separate network entity providing the information on various heterogeneous networks adjacent at the present position of the mobile terminal so that the mobile station makes use of the information and, a handover policy for its handover operations.

Using the MIH event, MIH command, and MIH information service, the upper mobility management protocol can minimize the delay and the packet loss occurring during handover between the heterogeneous wireless networks, thereby providing high-quality service to the user.

Referring to FIGS. 2 and 3, the MIH user 122 of the MIH server 120 perceives that it is required to perform handover from the broadcasting network to the communication network and determines the execution of the handover, the MIH user 122 of the MIH server 120 generates a request primitive (S300) and transfers the request primitive to the MIH function 124 of the MIH server 120 (S310). In this case, the request primitive is used for the MIH user of the MIH server 120 to provide information on the available communication networks to the MIH users of the specific group of terminals and it is used to indicate the handover from the broadcasting network to the corresponding communication network. The request primitive includes the service information for identifying the specific group of terminals that receives the command of handover from the broadcasting network to the communication network. In this case, the service information may include the information on the broadcast contents that are simultaneously watched by the specific group of terminals. The request primitive does not require the response from the MIH user of the terminals. In the present invention, the request primitive may be compatible with MIH_Net_Bcst_HO_Commit.request primitive. The MIH function 124 of the MIH server 120 transmits the handover indication message to the MIH function of the specific group of terminals that receives the command of handover from the broadcasting network to the communication network (S320). In this case, the MIH function 124 of the MIH server 120 may transmit the handover indication message toward a destination identifier for identifying the specific group of terminals 160. In this case, the specific group of terminals mean a plurality of user terminals that watch the specific broadcast contents and the MIH server 120 may recognize the plurality of user terminals as one group of terminals. In the present invention, the handover indication message may be compatible with the MIH_Net_Bcst_HO_Commit indication message, or the like. The handover indication message is a unidirectional message and the terminals 160 do not transmit the response message after receiving the handover indication message.

The MIH function of the terminal 160 receiving the handover indication message generates the indication primitive and transmits the indication primitive to the MIH user of the terminal 160 (S330). In this case, the indication primitive is used by the MIH function of the terminal 160 in order for the MIH user of the terminal 160 to perform handover from the broadcasting network to the communication network. In the present invention, the indication primitive may be compatible with MIH_Net_Bcst_HO_Commit.indication primitive.

The MIH user of the terminal 160 receiving the indication primitive performs appropriate link operations in order to execute the command of the MIH server 120 (S340).

As described above, the MIH server 120 initiates the handover procedures and transmits the unidirectional handover indication message to the plurality of terminals, thereby commanding handover of the specific group of terminals.

Hereinafter, the detailed contents of the handover indication message, the request primitive, and the indication primitive according to the exemplary embodiment of the present invention will be described below.

Table 1 shows the handover indication message according to the exemplary embodiment of the present invention.

TABLE 1

| MIH Header Fixed Fields (SID = 3, Opcode = 3, AID = 12[1]) |
|---|
| Source Identifier = sending MIHF ID |
| (Source MIHF ID TLV) |
| Destination Identifier = receiving MIHF ID |
| (Destination MIHF ID TLV) |
| TargetMNGroupInfo |
| (Target mobile node group info TLV) |
| LinkType |
| (Link type TLV) |
| TargetNetworksInfoList |
| (List of target netework info TLV) |
| LinkActionExecutionDelay |
| (Time interval TLV) |
| LinkActionList |
| (Link actions list TLV) |

As shown in Table 1, the handover indication message includes a source identifier field, a destination identifier field, a TargetMNGroupinfo field, a LinkType field, a TargetNetworkInfoList field, a LinkActionExecutionDelay field, and a LinkActionList field.

The source identifier field includes identification information on the MIH function 122 of the MIH server 120 transmitting the handover indication message.

The destination identifier field includes the identification information of the MIH function of the specific group of terminals 160 receiving the handover indication in message.

The TargetMNGroupinfo field includes the service information for identifying the specific group of terminals that receive the command of handover from the broadcasting network to the communication network. In this case, the service information may include the information on the broadcast contents that are simultaneously watched by the specific group of terminals.

The LinkType field includes the link type information (see Institute of Electrical and Electronics Engineers (IEEE) 802.21, 802.21a, 802.21b, 802.21c and/or 802.21x standard) on the network to which the specific group of terminals receiving the command of handover from the broadcasting network to the communication network is connectable. The link type information may be a type such as Wireless IEEE 802.16, Wireless EDGE, or the like.

The TargetNetworkInfoList field includes the link type information (see Institute of Electrical and Electronics Engineers (IEEE) 802.21, 802.21a, 802.21b, 802.21c and/or 802.21x standard) on the networks to which the specific group of terminals receiving the command of handover from the broadcasting network to the communication network is connectable. The information on the networks may include, for example, the identification information and the link address on the network, or the like.

The LinkActionExecutionDelay field includes information on execution time of the link operations required by the MIH server 120 (see Institute of Electrical and Electronics Engineers (IEEE) 802.21, 802.21a, 802.21b, 802.21c and/or 802.21x standard).

The LinkActionList field includes the information on the link operations required by the MIH server 120 (see Institute of Electrical and Electronics Engineers (IEEE) 802.21, 802.21a, 802.21b, 802.21c and/or 802.21x standard). The information on the link operations may include the link identifier and the operation of the corresponding link.

Table 2 indicates the request primitive.

TABLE 2

MIH_Net_Bcst_HO_Commit.request (
    DestinationIdentifier,
    TargetMNGroupInfo,
    LinkType,
    TargetNetworksInfoList,
    LinkActionExecutionDelay,
    LinkActionsList
)

A MIH_Net_Bcst_HO_Commit.request that is the request primitive includes DestinationIdentifier, TargetMNGroupInfo, LinkType, TargetNetworkInfoList, LinkActionExecutionDelay and LinkActionList.

DestinationIdentifier includes the transmission address information for identifying the specific group of terminals 160 that receives the command of handover from the broadcasting network to the communication network.

The TargetMNGroupInfo includes the service information for identifying the specific group of terminals 160 that receives the command of handover from the broadcasting network to the communication network. In this case, the service information for identifying the specific group of terminals 160 receiving the handover request may include the information on the broadcast contents that is simultaneously watched by the specific group of terminals.

The LinkType includes the link type information (see Institute of Electrical and Electronics Engineers (IEEE) 802.21, 802.21a, 802.21b, 802.21c and/or 802.21x standard) on the network to which the specific group of terminals receiving the command of handover from the broadcasting network to the communication network is connectable.

The TargetNetworkInfoList includes the link type information (see Institute of Electrical and Electronics Engineers (IEEE) 802.21, 802.21a, 802.21b, 802.21c and/or 802.21x standard) on the networks to which the specific group of terminals receiving the command of handover from the broadcasting network to the communication network is connectable.

The LinkActionList includes the information on the link operations required by the MIH server 120 (see Institute of Electrical and Electronics Engineers (IEEE)802.21, 802.21a, 802.21b, 802.21c and/or 802.21x standard).

The LinkActionExecutionDelay includes information on execution time of the link operations required by the MIH server 120 (see Institute of Electrical and Electronics Engineers (IEEE) 802.21, 802.21a, 802.21b, 802.21c and/or 802.21x standard).

Table 3 indicates the indication primitive.

TABLE 3

MIH_Net_Bcst_HO_Commit.indication (
    SourceIdentifier,
    TargetMNGroupInfo,
    LinkType,
    TargetNetworksInfoList,
    LinkActionExecutionDelay,
    LinkActionsList
)

A MIH_Net_Bcst_HO_Commit.request that is the indication primitive includes DestinationIdentifier, TargetMNGroupInfo, LinkType, TargetNetworkInfoList, LinkActionExecutionDelay and LinkActionList.

The sourceidentifier field includes the MIH information of the MIH server 120 transmitting the handover indication message.

The TargetMNGroupInfo includes the service information for identifying the specific group of terminals 160 that receives the command of handover from the broadcasting network to the communication network. In this case, the service information for identifying the specific group of terminals 160 receiving the handover request may include the information on the broadcast contents that is simultaneously watched by the specific group of terminals.

The LinkType includes the link type information (see Institute of Electrical and Electronics Engineers (IEEE) 802.21, 802.21a, 802.21b, 802.21c and/or 802.21x standard) on the network to which the specific group of terminals receiving the command of handover from the broadcasting network to the communication network is connectable.

The TargetNetworkInfoList includes the link type information (see Institute of Electrical and Electronics Engineers (IEEE) 802.21, 802.21a, 802.21b, 802.21c and/or 802.21x standard) on the networks to which the specific group of terminals receiving the command of handover from the broadcasting network to the communication network is connectable.

The LinkActionExecutionDelay includes information on execution time of the link operations required by the MIH server 120 (see Institute of Electrical and Electronics Engineers (IEEE) 802.21, 802.21a, 802.21b, 802.21c and/or 802.21x standard).

The LinkActionList includes the information on the link operations required by the MIH server (see Institute of Electrical and Electronics Engineers (IEEE) 802.21, 802.21a, 802.21b, 802.21c and/or 802.21x standard).

Meanwhile, the MIH information service defined in IEEE 802.21-2008 standard provides the service information supporting the heterogeneous networks of the surroundings. The MIH information service may be used as the basic information for determining the handover between the heterogeneous networks of the terminal. Institute of Electrical and Electronics Engineers (IEEE) 802.21, 802.21a, 802.21b, 802.21c and/or other 802.21x standard defines the information as an information element IE.

Table 4 indicates IE defining in Institute of Electrical and Electronics Engineers (IEEE) 802.21, 802.21a, 802.21b, 802.21c and/or other 802.21x standard.

TABLE 4

| Name of information element | Description | Data type |
|---|---|---|
| General information elements | | |
| IE_NETWORK_TYPE | Link types of the access networks that are available in a given geographical area. | NETWORK_TYPE |

TABLE 4-continued

| Name of information element | Description | Data type |
|---|---|---|
| IE_OPERATOR_ID | The operator identifier for the access network/core network. | OPERATOR_ID |
| IE_SERVICE_PROVIDER_ID | Identifier for the service provider. | SP_ID |
| IE_COUNTRY_CODE | Indicate the country. | CNTRY_CODE |
| *Access network specific information elements* | | |
| IE_NETWORK_ID | Identifier for the access network. | NETWORK_ID |
| IE_NETWORK_AUX_ID | An auxiliary access network identifier. As an example for IEEE 802.11 this refers to the homogenous extended service set ID (HESSID). | NET_AUX_ID |
| IE_ROAMING_PARTNERS | Roaming Partners. Network Operators with which the current network operator has direct roaming agreements. | ROAMING_PTNS |
| IE_COST | Cost. Indication of cost for service or network usage. | COST |
| IE_NETWORK_QOS | QoS characteristics of the link layer. | QOS_LIST |
| IE_NETWORK_DATA_RATE | Data Rate. The maximum value of the data rate supported by the link layer of the access network. | DATA_RATE |
| IE_NET_REGULAT_DOMAIN | Regulatory classes supported by the access network. | REGU_DOMAIN |
| IE_NET_FREQUENCY_BANDS | Frequency bands supported by the network. | FREQ_BANDS |
| IE_NET_IP_CFG_METHODS | IP Configuration Methods supported by the access network. | IP_CONFIG |
| IE_NET_CAPABILITIES | Bitmap of access network capabilities. | NET_CAPS |
| IE_NET_SUPPORTED_LCP | List of location configuration protocols supported by the access network. | SUPPORTED_LCP |
| IE_NET_MOB_MGMT_PROT | Type of mobility management protocol supported. | IP_MOB_MGMT |
| IE_NET_EMSERV_PROXY | Address of the proxy providing access to public safety answering point (PSAP). | PROXY_ADDR |
| IE_NET_IMS_PROXY_CSCF | Address of the proxy providing access to IMS P-CSCF. | PROXY_ADDR |
| IE_NET_MOBILE_NETWORK | Indicator whether the access network itself is mobile. | BOOLEAN |
| *PoA-specific information elements* | | |
| IE_POA_LINK_ADDR | Link-layer address of PoA. | LINK_ADDR |
| IE_POA_LOCATION | Geographical location of PoA. Multiple location types are supported including coordinate-based location information. civic address, and cell ID. | LOCATION |
| IE_POA_CHANNEL_RANGE | Channel Range/Parameters. Spectrum range supported by the channel for that PoA. | CH_RANGE |
| IE_POA_SYSTEM_INFO | System information supported by the link layer of a given PoA. | SYSTEM_INFO |
| *PoA-specific higher layer service information elements* | | |
| IE_POA_SUBNET_INFO | Information about subnets supported by a typical PoA. | IP_SUBNET_INFO |
| IE_POA_IP_ADDR | IP Address of PoA. | IP_ADDR |
| *Other information elements* | | |
| Vendor_specific_IEs | Vendor-specific services. | N/A |

Institute of Electrical and Electronics Engineers (IEEE) 802.21, 802.21a, 802.21b, 802.21c and/or other 802.21x standard classifies each defined IE into three information element containers such as IE_CONTAINER_LIST_OF_NETWORKS, IE_CONTAINER_NETWORK, IE_CONTAINER_POA.

Meanwhile, Institute of Electrical and Electronics Engineers (IEEE) 802.21b is a task group standardizing the optimization technology of the handover between the broadcasting network and the communication network that provides the mobile broadcasting service. However, IE showing the broadcasting service information supporting in the network is not defined in Institute of Electrical and Electronics Engineers (IEEE) 802.21 standard. Therefore, in order to optimize the handover between the broadcasting network and the communication network, the IE showing the broadcasting service information supporting in the network is defined and the MIH information server 160 propose a method that provides the broadcasting service related IE to the MIH function of the terminal 160 or the MIH function of the network.

The IE for the broadcasting service supported in the network according to the exemplary embodiment of the present invention may include the identification information on the broadcast contents, the broadcasting service information providing a series of the broadcast contents, security information on the broadcast contents, and use authority information on the broadcasting service.

Table 5 indicates the IE for the broadcasting service supported in the network according to the exemplary embodiment of the present invention.

TABLE 5

| Name of information element | Description | Data type |
| --- | --- | --- |
| *General information elements* | | |
| IE_NETWORK_TYPE | Link types of the access networks that are available in a given geographical area. | NETWORK_TYPE |
| IE_OPERATOR_ID | The operator identifier for the access network/core network. | OPERATOR_ID |
| IE_SERVICE_PROVIDER_ID | Identifier for the service provider. | SP_ID |
| IE_COUNTRY_CODE | Indicate the country. | CNTRY_CODE |
| *Access network specific information elements* | | |
| IE_NETWORK_ID | Identifier for the access network. | NETWORK_ID |
| IE_NETWORK_AUX_ID | An auxiliary access network identifier. As an example for IEEE 802.11 this refers to the homogenous extended service set ID (HESSID). | NET_AUX_ID |
| IE_ROAMING_PARTNERS | Roaming Partners. Network Operators with which the current network operator has direct roaming agreements. | ROAMING_PTNS |
| IE_COST | Cost. Indication of cost for service or network usage. | COST |
| IE_NETWORK_QOS | QoS characteristics of the link layer. | QOS_LIST |
| IE_NETWORK_DATA_RATE | Data Rate. The maximum value of the data rate supported by the link layer of the access network. | DATA_RATE |
| IE_NET_REGULAT_DOMAIN | Regulatory classes supported by the access network. | REGU_DOMAIN |
| IE_NET_FREQUENCY_BANDS | Frequency bands supported by the network. | FREQ_BANDS |
| IE_NET_IP_CFG_METHODS | IP Configuration Methods supported by the access network. | IP_CONFIG |
| IE_NET_CAPABILITIES | Bitmap of access network capabilities. | NET_CAPS |
| IE_NET_SUPPORTED_LCP | List of location configuration protocols supported by the access network. | SUPPORTED_LCP |
| IE_NET_MOB_MGMT_PROT | Type of mobility management protocol supported. | IP_MOB_MGMT |
| IE_NET_EMSERV_PROXY | Address of the proxy providing access to public safety answering point (PSAP). | PROXY_ADDR |
| IE_NET_IMS_PROXY_CSCF | Address of the proxy providing access to IMS P-CSCF. | PROXY_ADDR |
| IE_NET_MOBILE_NETWORK | Indicator whether the access network itself is mobile. | BOOLEAN |
| IE_BCST_PROGRAM_ID | Identifier for the program the access network is currently serving. | Tbd |
| IE_BCST_SERVICE_INFO | Service information supported by the access network. | Tbd |
| IE_BCST_SERVICE_PROTECTION_INFO | Service protection information supported by the access network. | Tbd |
| IE_BCST_PROGRAM_PROTECTION_INFO | Content protection information supported by the access network. | Tbd |
| *PoA-specific information elements* | | |
| IE_POA_LINK_ADDR | Link-layer address of PoA. | LINK_ADDR |
| IE_POA_LOCATION | Geographical location of PoA. Multiple location types are supported including coordinate-based location information, civic address, and cell ID. | LOCATION |
| IE_POA_CHANNEL_RANGE | Channel Range/Parameters. Spectrum range supported by the channel for that PoA. | CH_RANGE |
| IE_POA_SYSTEM_INFO | System information supported by the link layer of a given PoA. | SYSTEM_INFO |

TABLE 5-continued

| Name of information element | Description | Data type |
|---|---|---|
| PoA-specific higher layer service information elements | | |
| IE_POA_SUBNET_INFO | Information about subnets supported by a typical PoA. | IP_SUBNET_INFO |
| IE_POA_IP_ADDR | IP Address of PoA. | IP_ADDR |
| Other information elements | | |
| Vendor_specific_IEs | Vendor-specific services. | N/A |

As indicated in Table 5, the IE for the broadcasting service supported in the network may be further included in a IE_CONTAINER_NETWORK group that is indicated in Table 4

Table 6 indicates the IE for the broadcasting service supported in the network according to another exemplary embodiment of the present invention.

TABLE 6

Information element ID = (see Table G.1)
Length = variable

IE_BCST_PROGRAM_ID
IE_BCST_SERVICE_INFO
IE_BCST_SERVICE_PROTECTION_INFO
IE_BCST_PROGRAM_PROTECTION_INFO

In indicated in Table 6, the IE for the broadcasting service supported in the network may be added while being defined as the new IE container. The newly defined IE container has the same IE ID information and length information as existing different IE container and includes identification information for the broadcast contents IE_BCST_PROGRAM_ID, broadcasting service information IE_BCST_SERVICE_INFO, security information on the broadcast contents IE_BCST_SERVICE_PROTECTION_INFO, and information on the broadcasting service use authority IE_BCST_PROGRAM_PROTECTION_INFO.

Table 7 indicates the IE for the broadcasting service supported in the network according to yet another exemplary embodiment of the present invention.

TABLE 7

| Name of information element | Description | Data type |
|---|---|---|
| General information elements | | |
| IE_NETWORK_TYPE | Link types of the access networks that are available in a given geographical area. | NETWORK_TYPE |
| IE_OPERATOR_ID | The operator identifier for the access network/core network. | OPERATOR_ID |
| IE_SERVICE_PROVIDER_ID | Identifier for the service provider. | SP_ID |
| IE_COUNTRY_CODE | Indicate the country. | CNTRY_CODE |
| Access network specific information elements | | |
| IE_NETWORK_ID | Identifier for the access network. | NETWORK_ID |
| IE_NETWORK_AUX_ID | An auxiliary access network identifier. As an example for IEEE 802.11 this refers to the homogenous extended service set ID (HESSID). | NET_AUX_ID |
| IE_ROAMING_PARTNERS | Roaming Partners. Network Operators with which the current network operator has direct roaming agreements. | ROAMING_PTNS |
| IE_COST | Cost. Indication of cost for service or network usage. | COST |
| IE_NETWORK_QOS | QoS characteristics of the link layer. | QOS_LIST |
| IE_NETWORK_DATA_RATE | Data Rate. The maximum value of the data rate supported by the link layer of the access network. | DATA_RATE |
| IE_NET_REGULAT_DOMAIN | Regulatory classes supported by the access network. | REGU_DOMAIN |
| IE_NET_FREQUENCY_BANDS | Frequency bands supported by the network. | FREQ_BANDS |
| IE_NET_IP_CFG_METHODS | IP Configuration Methods supported by the access network. | IP_CONFIG |
| IE_NET_CAPABILITIES | Bitmap of access network capabilities. | NET_CAPS |
| IE_NET_SUPPORTED_LCP | List of location configuration protocols supported by the access | SUPPORTED_LCP |

TABLE 7-continued

| Name of information element | Description | Data type |
|---|---|---|
| | network. | |
| IE_NET_MOB_MGMT_PROT | Type of mobility management protocol supported. | IP_MOB_MGMT |
| IE_NET_EMSERV_PROXY | Address of the proxy providing access to public safety answering point (PSAP). | PROXY_ADDR |
| IE_NET_IMS_PROXY_CSCF | Address of the proxy providing access to IMS P-CSCF. | PROXY_ADDR |
| IE_NET_MOBILE_NETWORK | Indicator whether the access network itself is mobile. | BOOLEAN |
| PoA-specific information elements | | |
| IE_POA_LINK_ADDR | Link-layer address of PoA. | LINK_ADDR |
| IE_POA_LOCATION | Geographical location of PoA. Multiple location types are supported including coordinate-based location information, civic address, and cell ID. | LOCATION |
| IE_POA_CHANNEL_RANGE | Channel Range/Parameters. Spectrum range supported by the channel for that PoA. | CH_RANGE |
| IE_POA_SYSTEM_INFO | System information supported by the link layer of a given PoA. | SYSTEM_INFO |
| PoA-specific higher layer service information elements | | |
| IE_POA_SUBNET_INFO | Information about subnets supported by a typical PoA. | IP_SUBNET_INFO |
| IE_POA_IP_ADDR | IP Address of PoA. | IP_ADDR |
| Other information elements | | |
| Vendor_specific_IEs | Vendor-specific services. | N/A |
| Broadcast Handover information elements | | |
| IE_BCST_PROGRAM_ID | Identifier for the program the access network is currently serving. | Tbd |
| IE_BCST_SERVICE_INFO | Service information supported by the access network. | Tbd |
| IE_BCST_SERVICE_PROTECTION_INFO | Service protection information supported by the access network. | Tbd |
| IE_BCST_PROGRAM_PROTECTION_INFO | Content protection information supported by the access network. | Tbd |

In indicated in Table 7, the IE for the broadcasting service supported in the network may be added in Table 4 while being defined as the new IE container.

The handover procedure starts at the network side and the terminal does not need to perform the response to the handover command, such that the group handover operation for the plurality of terminals can be performed.

When the specific broadcast contents transmitted through the broadcasting network forcibly ends, the reception of the corresponding broadcast contents may be converted into the communication network. Therefore, the user may continuously receive the corresponding broadcast contents.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of commanding, by a handover control apparatus, a group of terminals to perform handover from a broadcasting network to a communication network, the method comprising:
generating a handover indication message comprising service information for identifying the group of terminals; and
transmitting the handover indication message to the group of terminals, wherein the transmitting comprises:
generating a handover request primitive comprising the service information for identifying the group of terminals at a first layer;
transmitting the handover request primitive to a second layer; and
transmitting the handover indication message to the group of terminals at the second layer.

2. The method of claim 1, wherein:
the first layer is a Media Independent Handover (MIH) user and the second layer is an MIH function.

3. The method of claim 1, wherein:
the handover request primitive further comprises at least one of information for identifying a specific group of terminals, link type information on networks to which the specific group of terminals can be connected, information on networks to which the specific group of terminals can be connected, information on link operations required by the handover control apparatus, and information on execution time of the link operations required by the handover control apparatus.

4. The method of claim 1, wherein:
the handover indication message is a unidirectional message that does not require responses from the group of terminals.

5. The method of claim 1, wherein:
the handover indication message further comprises at least one of information for identifying the handover control apparatus, information for identifying a specific group of terminals, link type information on networks to which the specific group of terminals can be connected, information on networks to which the specific group of terminals can be connected, information on link operations required by the handover control apparatus, and information on execution time of the link operations required by the handover control apparatus.

6. A handover method of a terminal from a broadcasting network to a communication network, the method comprising:
receiving a handover indication message comprising service information for identifying a group of terminals belonging to the terminal from a handover control apparatus; and
executing a handover command based on the handover indication message, wherein the executing comprises:
generating a handover indication primitive comprising the service information at a first layer;
transmitting the handover indication primitive to a second layer; and
executing the handover command at the second layer.

7. The method of claim 6, wherein:
the first layer is a MIH function and the second layer is an MIH user.

8. The method of claim 6, wherein:
the handover indication primitive further comprises at least one of information for identifying the handover control apparatus, link type information on networks to which a specific group of terminals can be connected, information on networks to which the specific group of terminals can be connected, information on link operations required by the handover control apparatus, and information on execution time of the link operations required by the handover control apparatus.

9. The method of claim 6, wherein:
the handover indication message is a unidirectional message that does not require responses from the group of terminals.

10. The method of claim 6, wherein:
the handover indication message further comprises at least one of information for identifying the handover control apparatus, information for identifying a specific group of terminals, link type information on networks to which the specific group of terminals can be connected, information on networks to which the specific group of terminals can be connected, information on link operations required by the handover control apparatus, and information on execution time of the link operations required by the handover control apparatus.

11. A handover control apparatus commanding a group of terminals to perform handover from a broadcasting network to a communication network, the apparatus comprising:
a first layer generating a handover request primitive comprising service information for identifying the group of terminals; and
a second layer receiving the handover request primitive from the first layer and transmitting a handover indication message comprising the service information to the group of terminals.

12. The apparatus of claim 11, wherein:
the handover indication message is a unidirectional message that does not require responses from the group of terminals.

13. The apparatus of claim 11, wherein:
the first layer is a Media Independent Handover (MIH) user and the second layer is an MIH function.

14. The apparatus of claim 11, wherein:
the handover request primitive further comprises at least one of information for identifying a specific group of terminals, link type information on networks to which the specific group of terminals can be connected, information on networks to which the specific group of terminals can be connected, information on link operations required by the handover control apparatus, and information on execution time of the link operations required by the handover control apparatus.

15. The apparatus of claim 11, wherein:
the handover indication message further comprises at least one of information for identifying the handover control apparatus, information for identifying a specific group of terminals, link type information on networks to which the specific group of terminals can be connected, information on networks to which the specific group of terminals can be connected, information on link operations required by the handover control apparatus, and information on execution time of the link operations required by the handover control apparatus.

* * * * *